(12) United States Patent
Merlini, III

(10) Patent No.: US 10,449,647 B2
(45) Date of Patent: Oct. 22, 2019

(54) FEED UNIT

(71) Applicant: Zagar Inc., Cleveland, OH (US)

(72) Inventor: Nicholas C. Merlini, III, Painesville, OH (US)

(73) Assignee: ZAGAR INC., Cleveland, OH (US)

( * ) Notice: Subject to any disclaimer, the term of this patent is extended or adjusted under 35 U.S.C. 154(b) by 491 days.

(21) Appl. No.: 14/880,415

(22) Filed: Oct. 12, 2015

(65) Prior Publication Data

US 2017/0100807 A1    Apr. 13, 2017

(51) Int. Cl.
| | |
|---|---|
| *B23Q 5/32* | (2006.01) |
| *B23Q 11/10* | (2006.01) |
| *F16H 25/20* | (2006.01) |
| *B23Q 5/12* | (2006.01) |
| *F16H 25/22* | (2006.01) |
| *B23Q 5/10* | (2006.01) |

(52) U.S. Cl.
CPC ............... *B23Q 5/326* (2013.01); *B23Q 5/10* (2013.01); *B23Q 5/12* (2013.01); *B23Q 5/32* (2013.01); *B23Q 11/103* (2013.01); *F16H 25/2018* (2013.01); *F16H 25/2204* (2013.01)

(58) Field of Classification Search
CPC ... B23Q 5/10; B23Q 5/12; B23Q 5/00; B23Q 5/40; B23Q 5/326; B23Q 5/32; B23Q 11/103; B23Q 11/10; F16H 25/2204; F16H 25/2018

USPC ........ 173/77, 146; 408/130, 15, 17, 702, 12, 408/137, 11; 74/424, 841
See application file for complete search history.

(56) References Cited

U.S. PATENT DOCUMENTS

| | | | | |
|---|---|---|---|---|
| 3,767,313 | A * | 10/1973 | Bohoroquez | B23B 45/008 408/132 |
| 4,799,803 | A * | 1/1989 | Tanaka | F16C 29/0695 384/43 |
| 5,100,271 | A * | 3/1992 | Kameyama | B23Q 5/402 408/129 |
| 5,888,033 | A * | 3/1999 | Zagar | B23Q 1/70 408/124 |
| 7,547,169 | B1 * | 6/2009 | Zagar | B23B 31/263 33/639 |

* cited by examiner

*Primary Examiner* — Alexander M Valvis
*Assistant Examiner* — Mary C Hibbert-Copeland
(74) *Attorney, Agent, or Firm* — Pearne & Gordon LLP

(57) ABSTRACT

A feed unit for drilling and/or tapping comprising a housing, a quill in the housing movable between retracted and extended positions, the quill rotationally supporting a spindle for carrying a rotary tool, a screw for moving the quill between said positions, a ball spline shaft in the housing coaxial with the spindle, a ball spline nut having recirculating steel balls rolling in raceways on the ball spline shaft, the spindle radially supporting the ball spline shaft within the quill with zero clearance through the ball spline nut, rotation of the ball spline shaft being imparted to the spindle through the ball spline nut.

5 Claims, 3 Drawing Sheets

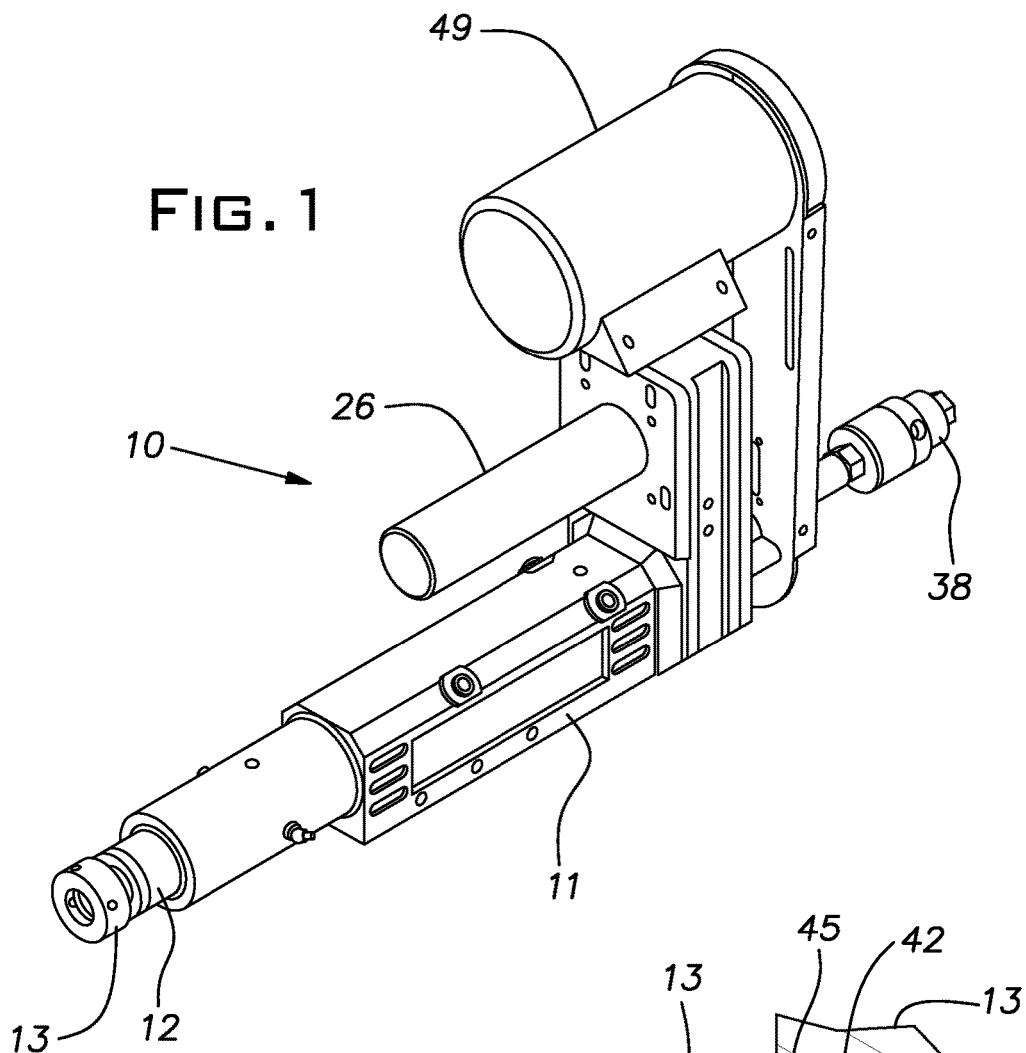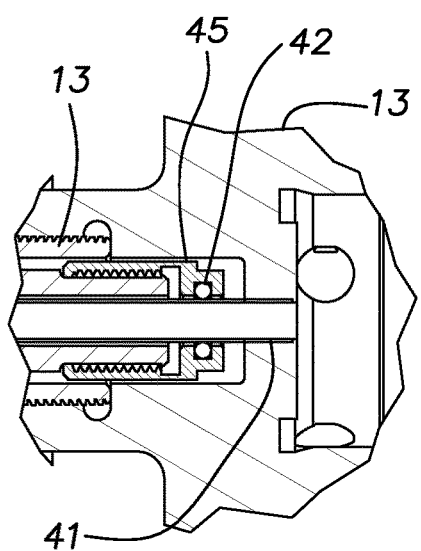

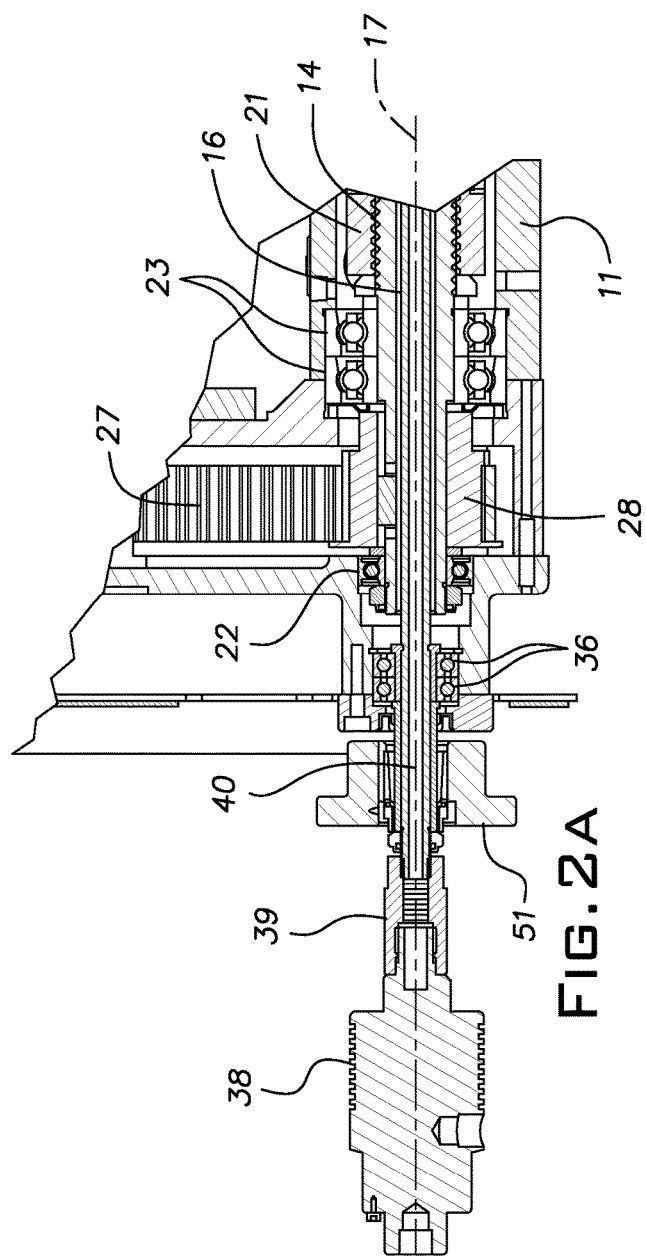
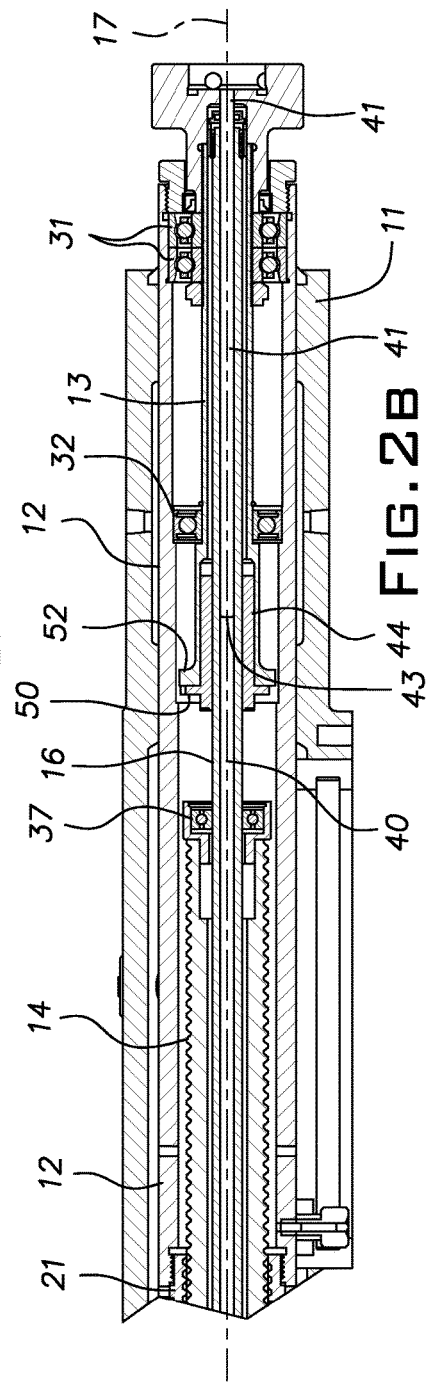
FIG. 2A
FIG. 2B

FEED UNIT

BACKGROUND OF THE INVENTION

The invention relates to machine tools and, in particular, to a spline drive for a quill supported spindle of a feed unit.

PRIOR ART

Feed units for drilling, tapping and like machining operations are shown, for example, in U.S. Pat. No. 7,547,169. These units have utilized an involute spline or straight tooth spline for transmitting torque between a stationary motor and an axially moveable spindle. These spline drives are characterized by sliding contact between the spline shaft and the female spline receiver. The sliding contact inevitably produces wear which, typically, results in vibration and chatter in the unit and in some cases actual failure of the spline teeth. These vibration and chatter disturbances can be harmful to bearings, tools and a workpiece being machined.

A traditional spline shaft for a feed unit can be expensive to manufacture because of the difficulty in obtaining a straight, necessarily slender, shaft after machining and heat treating steps.

SUMMARY OF THE INVENTION

The invention provides a feed unit with a ball spline spindle drive that eliminates sliding surface contact and the problems associated with such contact. A ball "nut", attached to an inner end of the spindle, rides on a ball spline shaft. The ball nut and ball spline shaft have zero radial and angular clearance. A quill mounted spindle bearing rotationally supports the spindle adjacent the ball nut. Because of the zero clearance between the ball spline shaft and ball nut, the spindle bearing also radially supports the ball spline shaft and thereby reduces a tendency of the ball spline shaft to whip at its mid-section when operating at high speed.

BRIEF DESCRIPTION OF THE DRAWINGS

FIG. 1 is an isometric view of a feed unit embodying the invention;

FIGS. 2A and 2B, taken together, are a longitudinal cross-sectional view of parts of the feed unit;

FIG. 3 is an enlarged fragmentary cross-section of the forward end of the spindle.

DESCRIPTION OF THE PREFERRED EMBODIMENTS

Figure 4:
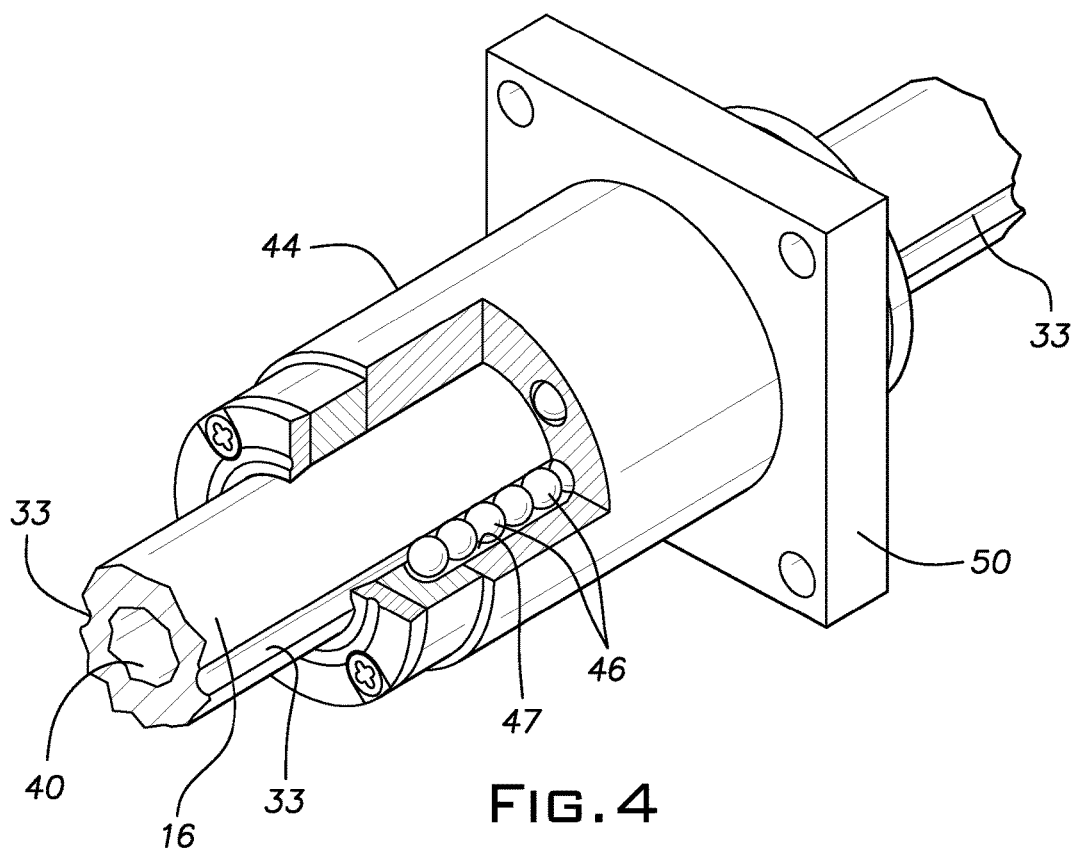
FIG. 4 an isometric, fragmental view of a ball spline and a ball nut used in the feed unit of the invention.

A feed unit 10 for axially feeding and rotating a tool comprises a housing 11 supporting a quill 12 carrying a spindle 13. The quill 12 is extended and retracted from and into the housing 11 by rotation of a ball screw 14. The spindle 13 is rotated by a shaft 16. The quill 12, spindle 13, ball screw 14 and shaft 16 are all concentric about a longitudinal axis 17. An inner end of the quill 12 is fixed to a ball nut 21 carried on the ball screw 14 so that rotation of the ball screw extends or retracts the quill 12 in and out of the housing 11. Bearings 22, 23 rotationally support the ball screw 14 in the housing 11 at an inner end. The ball screw 14 is rotated by a motor 26 (FIG. 1) through a belt 27 and pulley 28. These bearings 22, 23 and the other bearings disclosed herein are precision high speed anti-friction units with zero radial clearance internally and with parts engaged with them.

The spindle 13 is rotationally supported in the forward end of the quill 12 by bearings 31 and towards its rear end by a bearing 32 also carried in the quill. The shaft 16 extends from one end of the unit 10 to the other. The shaft 16 is of the ball spline type having diametrally opposed longitudinally extending grooves 33 (FIG. 4) on its exterior. The ball spline shaft 16 is rotationally supported in the housing 11 by bearings 36 at the rear of the housing 11 and at roughly mid-length by a bearing 37 carried on a forward end of the ball screw 14.

The ball spline shaft 16 has a central bore 40 thereby enabling it to conduct coolant liquid from a rotary union 38 and coupling 39 to the spindle 13. A forward end of the ball spline shaft bore 40 receives a coolant tube 41. The tube 41 is open at its inner end 43 and at its outer end is sealed with the ball spline shaft 16 by an O-ring 42 in a threaded cap 45 (FIG. 3).

A ball spline nut 44 is assembled on the ball spline shaft 16 and is fixed by bolts (not shown) extending between a flange 50 of the ball spline nut and a flange 52 on an inner end of the spindle 13.

The ball spline nut 44 (FIG. 4) of known construction includes recirculating balls 46 (FIG. 3) in grooves or raceways 47 aligned with the spline shaft raceways indicated at 48. The ball spline nut 44 is proportioned to provide an interference fit with zero radial and angular clearance with the ball spline shaft 16.

The ball spline shaft 16 is rotated by a motor 49 (FIG. 1) through a belt (not shown) driving a pulley 51 fixed on the ball spline shaft near its rear end. Rotation of the ball spline shaft 16 is imparted to the spindle 13 through the ball spline nut 44. Rotation of the ball screw 14 causes the quill 12 and spindle 13 to move axially relative to the housing 11. The ball spline nut 44 moves axially along the ball spline shaft 16 as the spindle 13 is carried by the quill 12 while transmitting torque from the ball spline shaft 16 to the spindle 13. The mid-length part of the ball spline shaft 16 is radially supported, without radial clearance, by the ball spline nut 44 which, in turn, is radially supported by the adjacent radial bearing 32 through a rear portion of the spindle 13. Additionally, as mentioned, the ball spline shaft 16 is radially supported by the bearing 37 on the forward end of the ball screw 14.

Coolant liquid is confined to the interior of the ball spline shaft 16 and the tube 41 by the O-ring 42 as the tube 41 moves out of the bore of the ball spline shaft with the forward movement of the quill 12 and spindle 13.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A feed unit for drilling and/or tapping comprising a housing, a quill in the housing supported for axial movement in the housing between a retracted position and an extended position where a portion of the quill extends beyond the quill housing, a forward end of the quill rotationally supporting a spindle adapted to support a rotary tool outside of said quill, a screw in the housing for moving the quill between said retracted and extended positions, a ball spline shaft in the housing coaxial with the spindle, a ball spline nut on the ball spline shaft, the ball spline nut having recirculating steel balls rolling in raceways on the ball spline shaft with zero clearance in a radial direction, the spindle radially supporting the ball spline shaft within the quill with zero clearance through the ball spline nut, the ball spline nut being fixed to the spindle in the quill whereby rotation of the ball spline shaft is imparted to the spindle through the ball spline nut, the spindle being supported by an anti-friction bearing carried in the quill axially offset from and adjacent the spline ball nut, whereby the ball spline shaft is radially supported by the quill through said bearing and said zero clearance between said recirculating steel balls of said ball nut and said raceways on the ball spline shaft, the ball spline shaft having an unsupported length between the screw and the ball nut of the ball spline shaft, said unsupported length increasing with extension of the quill, a location of the ball nut of the ball spline shaft adjacent an inward end of the spindle contributing to minimization of said unsupported length.

2. A feed unit as set forth in claim 1, wherein said bearing is disposed between the spline nut and spindle bearings at a forward end of the quill.

3. A feed unit as set forth in claim 2, wherein the spindle has a stepped diameter, a larger diameter of the spindle surrounding the spline nut, a smaller diameter of the spindle being supported in an inner race of said anti-friction spindle bearing.

4. A feed unit as set forth in claim 3, wherein the spline shaft supported in a bearing in a forward end of the screw.

5. A feed unit as set forth in claim 1, wherein said ball spline shaft is hollow, a rotary union at a rear end of the spline shaft, and a tube telescoped in a central bore of the spline shaft and a seal at a forward end of the spline shaft engaging an outer diameter of the telescoped tube, the telescoped tube being attached to the spindle to conduct coolant to a tool mounted on the spindle.

* * * * *